Patented Mar. 17, 1925.

1,530,009

UNITED STATES PATENT OFFICE.

FRANKLIN G. NEAL, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF VULCANIZING TIRE CASINGS.

No Drawing. Application filed February 5, 1920, Serial No. 356,366. Renewed April 27, 1922. Serial No. 557,003.

*To all whom it may concern:*

Be it known that I, FRANKLIN G. NEAL, a citizen of the United States of America, residing at Springfield, in the county of Hampden and State of Massachusetts, have invented certain new and useful Improvements in Methods of Vulcanizing Tire Casings, of which the following is a specification.

My invention relates to methods of vulcanizing rubber articles such as tire casings, and particularly to improvements in methods in which the tire casing is expanded into an outer mold during vulcanization.

My improved method is preferably carried out as follows:

An unvulcanized tire casing is mounted upon an expansible member such as an air or water bag (although steam, air, or gas in direct contact with the interior of the casing, or even an expansible rigid core, may be used if desired) and enclosed in a mold. The mold is subjected to the vulcanizing heat, and pressure applied through the expansible member to an extent sufficient to cause the tire casing to completely fill the pattern of the mold. This pressure is continued until the rubber has had an opportunity to take the impression of the mold and then become partially vulcanized and set in its formed condition. The length of time for this high pressure cure, however, is preferably reduced to the minimum necessary to produce these results, as by shortening the time during which the necessary high pressure is applied, the life of the vulcanizing equipment, especially the air or water bag of rubberized fabric, is prolonged and the quality of the product improved. I have found that good results are attained if the length of this cure is about one-third or less of the time necessary for complete vulcanization.

After a sufficient time has elapsed under the high pressure the pressure within the expansible member is reduced and the vulcanization continued in the mold. The amount of this second pressure is not important in itself, although it should be of a degree sufficient to keep the plies of the tire and water or air bag from separating and the rubber from blowing. I have obtained very satisfactory results from a pressure between one-third and one-half of the original high pressure. For example, a 33 x 4 tire of a rubber content which will completely vulcanize according to the usual method in about one hour and fifty minutes is vulcanized in the mold according to my method by expanding it through a water bag having a pressure of about 350 pounds per square inch for thirty minutes and then reducing this pressure to 140 pounds per square inch for one hour and twenty minutes. This has produced the desired results but is only an example characterized by the substantial reduction in pressure after the tire has been formed by the mold under great pressure and then a retention of such reduced pressure to hold the tire in the best condition for its continued cure.

The only change necessary during the process is a variation in the internal pressure and therefore there is no need of interrupting the cure at any point. This eliminates difficulties of extra labor in opening and closing heaters, and avoids loss of heat in the molds and tires. Another advantage, in cases where an air or water bag is used, is that the life of this equipment is greatly increased. It will be further understood that I do not intend to be limited to the exact times of cure and amounts of pressure specified except as the same are included as positive limitations in the appended claims; as both times and pressure may be varied within wide limits depending on the nature of the material being treated.

I claim:

1. The process of vulcanizing a tire casing wherein it is inclosed in a rigid mold and forced into contact with the mold during its entire vulcanization period by an expanding pressure; characterized by a substantial decrease in said pressure after the tire is formed and during its continued vulcanization, said decreased pressure being sufficient to hold the tire expanded against the mold.

2. The process of vulcanizing a tire casing wherein it is inclosed in a rigid mold and forced into contact with the mold by an internal expanding pressure; characterized by an initial vulcanization under relatively high expanding pressure, and a later vulcanization under a substantially lower expanding pressure.

3. The process of vulcanizing rubber articles comprising partially vulcanizing them at a forming pressure sufficient to impress upon them the desired form, and subjecting them without interruption of vulcanization to a further vulcanization at a holding pressure less than required in the first step.

4. The process of vulcanizing rubber articles comprising partially vulcanizing them at a pressure sufficient to impress upon them the desired form and completing the vulcanization without interruption and under a reduced pressure.

5. The method of vulcanizing a hollow rubber article comprising enclosing it in a rigid mold, partially vulcanizing the article while it is forced into the mold by an internal expanding pressure sufficient to cause the article to completely fill the mold, and subjecting the article to a further vulcanization at a reduced expanding pressure.

6. The process of vulcanizing a tire casing comprising mounting the casing on an expansible member, enclosing the assembly in a rigid mold, applying to the casing through the expansible member a pressure sufficient to cause the casing to thoroughly fill the mold, heating the casing while so held to partially vulcanize the same, and continuing the vulcanization under a reduced pressure of said expansible member sufficient to hold the tire to the mold and prevent its laminations from separating and its rubber from blowing.

FRANKLIN G. NEAL.